United States Patent
Al-Sehemi et al.

(10) Patent No.: US 11,359,076 B2
(45) Date of Patent: Jun. 14, 2022

(54) CONSTRUCTION OF ELASTOMERIC BIOCOMPOSITE INTENDED FOR INSULATING LAYERS AND PADS WITH REGARD TO FLEXIBLE ANTENNA

(71) Applicant: The Research Center for Advanced Materials Science King Khalid University (KKU), Abha (SA)

(72) Inventors: Abdullah G. Al-Sehemi, Abha (SA); Ahmed A. Al-Ghamdi, Jeddah (SA); Nikolay Todorov Dishovski, Sofia (BG); Lychezar Nikolaev Radev, Sofia (BG); Irena Kirilova Mihaylova, Sofia (BG); Petrunka Atanasova Malinova, Sofia (BG); Nikolay Todorov Atanasov, Sofia (BG); Gabriela Lychezarova Atanasova, Sofia (BG)

(73) Assignee: The Research Center for Advanced Materials Science King Khalid University (KKU), Abha (SA)

( * ) Notice: Subject to any disclaimer, the term of this patent is extended or adjusted under 35 U.S.C. 154(b) by 0 days.

(21) Appl. No.: 16/858,771

(22) Filed: Apr. 27, 2020

(65) Prior Publication Data
US 2021/0054175 A1 Feb. 25, 2021

(30) Foreign Application Priority Data
Aug. 23, 2019 (BG) .......................... 112988

(51) Int. Cl.
*C08L 7/00* (2006.01)
*C08K 3/22* (2006.01)
(Continued)

(52) U.S. Cl.
CPC ................ *C08L 7/00* (2013.01); *C03C 3/062* (2013.01); *C03C 3/078* (2013.01); *C08K 3/06* (2013.01);
(Continued)

(58) Field of Classification Search
CPC . C08L 7/00; C03C 3/087; C03C 3/097; C03C 3/062
See application file for complete search history.

(56) References Cited

U.S. PATENT DOCUMENTS

| 6,482,444 B1 * | 11/2002 | Bellantone ............ A61L 17/005 424/618 |
| 2017/0015812 A1 * | 1/2017 | Miyazaki ................. C08K 5/18 |
| 2019/0106553 A1 * | 4/2019 | Al-Sehemi ............... B32B 3/08 |

OTHER PUBLICATIONS

Pongdhorn Sae-oui et al., "Effect of Curing System on Reinforcing Efficiency of Silane Coupling Agent," 23 Polymer Testing 397 (2004).*

(Continued)

*Primary Examiner* — Nicholas E Hill
(74) *Attorney, Agent, or Firm* — Maier & Maier, PLLC

(57) ABSTRACT

The disclosure relates to a composition of biocomposite based on natural rubber containing sol-bioglass, which is used and intended for insulating layers and pads in flexible antennas which can be worn in close vicinity with regard to the human body without adversely affecting it. According to the invention, the composition of the biocomposite intended and designed for insulating layers and pads in flexible antennas based on natural rubber is filled with sol-gel derived bioglass amounting to a quantitative range starting from 8 to 50 parts by weight with regard to 100 parts by weight rubber and having following list of remaining ingredients: zinc oxide from 2.5 to 3.5, stearic acid from 1 to 2.5, bis (triethoxysilylpropyl) tetrasulfide from 4 to 6, tertiary butyl-benzothiazolyl sulfenamide from 1 to 2.5, sulfur from (Continued)

Figure 1A:
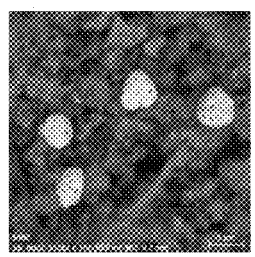

1 to 3 and isopropyl-phenyl-β-phenylene diamine from 0.5 to 1.5.

1 Claim, 3 Drawing Sheets

(51) Int. Cl.
      *C08K 3/06*       (2006.01)
      *C08K 5/09*       (2006.01)
      *C08K 5/548*      (2006.01)
      *C08K 5/18*       (2006.01)
      *C03C 3/062*      (2006.01)
      *C03C 3/078*      (2006.01)
      *C08K 5/47*       (2006.01)

(52) U.S. Cl.
     CPC .................. *C08K 3/22* (2013.01); *C08K 5/09* (2013.01); *C08K 5/18* (2013.01); *C08K 5/47* (2013.01); *C08K 5/548* (2013.01); *C03C 2204/02* (2013.01); *C08K 2003/2296* (2013.01); *C08L 2203/02* (2013.01)

(56) References Cited

OTHER PUBLICATIONS

M. J. Silva et al., "Study of Thermal and Mechanical Properties of a Biocomposite Based On Natural Rubber and 45S5 Bioglass® Particles," 131 Journal of Thermal Analysis and Calorimetry 735 (2018).*

Al-Sehemi et al., "Design and performance analysis of dual-band wearable compact low-profile antenna for body-centric wireless communications", International Journal of Microwave and Wireless Technologies, Dec. 2018, pp. 1175-1185, vol. 10, Issue 10; 11 pages.

* cited by examiner

CONSTRUCTION OF ELASTOMERIC BIOCOMPOSITE INTENDED FOR INSULATING LAYERS AND PADS WITH REGARD TO FLEXIBLE ANTENNA

STATE OF THE ART SCOPE AND OBJECT

The present invention relates to a biocomposite structure based on natural rubber containing sol-gel-derived Bioglass which is applicable with regard to insulating layers and pads in flexible antennas that can be worn and operated in close vicinity to the human body without causing adverse effects and interference therein.

BACKGROUND OF PRIOR ART

The use of bioactive glass reinforced elastomer-based composites for skeletal regeneration has become known and available to the public domain by means if publications entitled *Bioactive Glass Reinforced Elastomer Composites for Skeletal Regeneration: A Review, Materials Science and Engineering C* 53 (2015) 175-188 divulged by Ehsan Zeimaran, Sara Pourshahrestani, Ivan Djordjevic, Belinda Pingguan-Murphy, Nahrizul Adib Kadri, Mark R. Towler. It has been ascertained that the use of bioactive glasses as a filler can contribute to enhancement of many of the elastomers' properties, but it is considered that there is a threshold of the degree of bioglass filling of the composites beyond which the strength properties of the composites deteriorate. In addition to the filler content, other parameters such as particle size and shape and glass composition also affect the final properties of the composite. The publication of M J Silva's, V O Soares's, G C Dias', R J Santos', A E Job's, A O Sanches', J A Malmonge's entitled *Study of thermal and mechanical properties of a biocomposite based on natural rubber and 45S5 Bioglass particles*, J Therm Anal calorim (2018) 131: 735-742 makes available to the public and discloses a study on the thermal and mechanical properties of biocomposites based on natural rubber and Bioglass particles having a composition comprising a content of: 24.3% $Na_2O$, 26.9% CaO, 2.5% $P_2O_5$ and 46.3% $SiO_2$ with a proportion between natural rubber and bioglass expresses as in terms of following ratio: 90:10, 70:30, 50:50, respectively. The authors have determined as a conclusion evidence for improvement with regard to the thermal stability of the composite enabled by increasing the amount of Bioglass, as well as enhancement of the mechanical properties, which, in their view, can provide opportunities for application with regard to biomedical applications.

The publication by Jiqiu Wen, Yubao Li, Yi Zuo, Gang Zhou, Junfeng Li, Liuyun Jiang, Wen Xu, *Preparation and characterization of nano-hydroxyapatite/silicone rubber composite, Materials Letters* 62 (2008) 3307-3309, makes available to the public domain and discloses characterization of siloxane rubber based composites and hydroxyapatite nanoparticles (in an amount of weight percentage of 30 to 60 wt. %) for medical applications. The authors determined that hydroxyapatite particles are well dispersed in siloxane rubber and that the mechanical properties of the composite demonstrate significant improvement. The Abdullah Al-Sehemi's publication "Design and performance of dual-band wearable compact low-profile antenna for body-centric wireless communications" in the International Journal of Microwave and Wireless Technologies, year: 2018, makes available to the public and discloses a compact dual-band low-profile antenna which is light and can be worn and used for the purposes of wireless telecommunication communications. The composition of the composite is based on butadiene-acrylonitrile rubber (NBR) and includes (with regard to 100 parts by weight rubber): butadiene-acrylonitrile rubber—100.0 zinc oxide—3.0, stearic acid—1.0, isopropyl phenyl-p-phenylenediamine—1.0, N-tert-butyl-2-benzothiazole sulphenamide—0.7.

SUMMARY AND DESCRIPTION OF THE INVENTION

The purpose of the present invention is to provide an elastomeric biocomposite intended for the use with regard to pads and insulating layers in flexible antennas that are lightweight, having the ability to regain the desired shape of the relevant object, comprising as well the possibility to remotely monitor subtle movement and provide a response as a function of the objects shape changes, as well as to have a range of anti-microbial capabilities. At the same time, these elastomeric composites must preserve their bending or pressure characteristics, they must demonstrate low relative dielectric constant aimed at bringing down the propagation delay, ensuring a low tangent value with regard to the dielectric losses angle (tan δε), to reduce the attenuation of the signal, signal quality, mechanical flexibility, high dimensional stability, moisture absorption resistance, high thermal conductivity to dissipate heat generated.

The purpose of the present invention is achieved by means of implementation of a composite structure of a biocomposite used for insulating layers and pads in flexible antennas based on natural rubber with a filler of sol-gel derived bioglass represented as being the equivalent to 8 to 50 parts by weight of 100 wt. rubber and having the following content comprising following remaining ingredients: zinc oxide 2.5 to 3.5, stearic acid 1 to 2.5, bis (triethoxysilylpropyl) tetrasulfide 4 to 6, tertiary butyl-benzothiazolyl sulfenamide 1 to 2.5, sulfur from 1 to 3 and isopropyl-phenyl-β-phenylene diamine from 0.5 to 1.5.

The sol-bioglass filler contains the following components in a proportion of: CaO—49-51%, $SiO_2$—39-41%, $P_2O_5$—8%, $Ag2O$—0.1-4%.

The composition of the elastomeric biocomposite according to the invention for the insulating layers and with regard to the pads in the flexible antennas is identical.

The attached tables and figures illustrate the compositions developed to a next, more detailed extend their quantitative and qualitative embodiments, as well as the indicators achieved.

The quantitative values of the filler composition—sol-gel derived bioglasses are provided in Table's 1 content.

TABLE 1

Composition of sol-gel derived bioglasses

| Sample | The chemical composition of the gel (wt. %) | | | |
| --- | --- | --- | --- | --- |
| | CaO | $SiO_2$ | $P_2O_5$ | $Ag_2O$ |
| BG0 | 51 | 40.9 | 8 | 0.1 |
| BG2 | 50 | 40 | 8 | 2 |
| BG4 | 49 | 39 | 8 | 4 |

The compositions of the elastomeric composites containing bioglass fillers are listed in Table 2 in wt. per 100 parts by weight rubber.

TABLE 2

Compositions of elastomeric composites containing sol-gel derived Bioglass

| Ingredients | BG0-10 | BG0-20 | BG0-45 | BG2-10 | BG2-20 | BG2-45 | BG4-10 | BG4-20 | BG4-45 |
|---|---|---|---|---|---|---|---|---|---|
| Natural rubber STR 10 | 100 | 100 | 100 | 100 | 100 | 100 | 100 | 100 | 100 |
| Zinc oxide | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 |
| Filler-sol-gel Bioglass | 10 | 20 | 45 | 10 | 20 | 45 | 10 | 20 | 45 |
| Bis (triethoxysilylpropyl) tetrasulfide | 5 | 5 | 5 | 5 | 5 | 5 | 5 | 5 | 5 |
| isopropyl-phenyl-p-phenylene diamine | 1 | 1 | 1 | 1 | 1 | 1 | 1 | 1 | 1 |
| tertiary butyl-benzo-thiazolyl sulfenamide | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 |

The sol gel Bioactive glasses obtained according to the invention have different phase composition depending on the content of $Ag_2O$ therein.

SEM-EDX method analysis has been conducted to determine qualitatively and quantitatively the composition of the wider scope area of the sol-gel derived bioglasses studied, as well as the composition of the individual points in these areas-illustrated within FIG. 1, FIG. 2.

FIG. 1 shows that the bioglass is homogeneous. With the exception of silver, the other elements, respectively phases, are evenly distributed therein. EDX analysis at individual points of the observed wide scope area of sol-bioglass containing 4% silver dioxide in its composition (FIG. 2) confirmed the presence of points with predominance of carbon, oxygen, silicon, calcium, phosphorus (m. e. hydroxylapatite, calcite) therein, as well as spots with a predominance of silver therein (refer to FIG. 2, Table 3).

FIG. 2 illustrates SEM images of sol-gel derived bioglasses containing 4% silver oxide, at specific points of which (highlighted on the images in FIG. 2 by means of a cross) an EDX analysis was performed, whose results are revealed within Table 3.

TABLE 3

Elemental composition at selected points in the observed area (highlighted on the images in FIG. 2 by means of a cross mark) in accordance with the EDX analysis data.

| Element | a | b | c | d |
|---|---|---|---|---|
| O | 20.58 | 18.94 | 38.19 | 4.77 |
| Si | 23.96 | 0.48 | 22.75 | 1.11 |
| Ca | 26.75 | — | 34.51 | — |
| P | 10.66 | — | 3.76 | — |
| Na | 3.47 | — | 0.20 | — |
| C | 1.70 | 2.66 | — | 4.88 |
| Cl | 4.10 | 0.45 | 0.58 | 6.24 |
| Mg | 1.58 | — | — | — |
| Ag | 6.17 | 77.16 | — | 83.00 |
| Al | 1.02 | — | — | — |

The results presented reveal in a clear manner that silver oxide alters the phase composition and structure of bioglass, being those changes progressively evidenced when increasing its concentration. The presence of elemental silver in the bioglass composition, respectively in the biocomposite (FIG. 2b, Table 3b) constitutes a guarantee of its antibacterial properties.

Vulcanization Characteristics

The vulcanization characteristics of compositions based on natural rubber containing sol-gel glasses are demonstrated within the content revealed in Table 4.

TABLE 4

Vulcanization characteristics at 150° C. of elastomeric mixtures containing sol-gel bioglass with different concentrations of silver oxide therein.

| Characteristics | BG0-10 | BG0-20 | BG0-45 | BG2-10 | BG2-20 | BG2-45 | BG4-10 | BG4-20 | BG4-45 |
|---|---|---|---|---|---|---|---|---|---|
| ML, dN·m | 0.12 | 0.26 | 0.76 | 0.11 | 0.15 | 0.22 | 0.13 | 0.17 | 0.24 |
| MH, dN·m | 3.58 | 3.79 | 8.41 | 2.79 | 4.92 | 6.33 | 4.05 | 5.54 | 7.28 |
| ΔM = MH − ML | | | | | | | | | |
| $t_{S1}$, m:s | 7:41 | 7:39 | 5:29 | 6:45 | 6:07 | 5:34 | 5:52 | 5:41 | 5:36 |
| $t_{S2}$, m:s | 7:56 | 7:10 | 5:56 | 7:12 | 7:11 | 6:17 | 6:09 | 6:05 | 6:03 |
| tand@ML | 1.500 | 1.296 | 1.091 | 1.636 | 1.467 | 1.500 | 1.308 | 1.833 | 1.417 |
| tand@MH | 0.052 | 0.090 | 0.127 | 0.077 | 0.080 | 0.082 | 0.036 | 0.040 | 0.044 |
| $T_{50}$, m:s | 7:51 | 7:51 | 6:22 | 6:51 | 7:17 | 7:34 | 6:08 | 6:31 | 6:58 |
| $t_{90}$, m:s | 8:48 | 8:47 | 8:02 | 7:47 | 8:51 | 11:24 | 7:35 | 9:07 | 11:01 |

Designated Concepts:

ML (minimum torque), MH (maximum torque), ΔM=MH-ML (characterizes the density of the vulcanization network), $T_{50}$ (optimal time for completion of 50% vulcanization); $T_{90}$ (optimal time to complete 90% vulcanization), $t_{s1}$ (Time to 1-unit increase in torque. Indicative of resistance to premature crosslinking (scorch)) and ts2 (scorch time (ts2) is the time required for the minimum torque value to increase by two units and measures the premature vulcanization of the material), tan d@ML (mechanical loss angle tangent at minimum torque), tan d @MH (mechanical loss angle tangent at maximum torque).

Physico-Mechanical Characteristics

The physical and mechanical characteristics of composites containing sol-gel bioglasses are demonstrated in Table 5.

TABLE 5

Physicomechanical characteristics of natural rubber based biocomposites containing sol-gel bioglasses with different concentrations of silver oxide therein.

| | BG0-10 | BG0-20 | BG0-45 | BG2-10 | BG2-20 | BG2-45 | BG4-10 | BG4-20 | BG4-45 |
|---|---|---|---|---|---|---|---|---|---|
| Stress at 100% elongation, $M_{100}$, MPa | 0.4 | 0.4 | 1.0 | 0.5 | 0.5 | 1.0 | 0.5 | 0.6 | 1.2 |
| Stress at 300% elongation, $M_{300}$, MPa | 1.3 | 1.3 | 5.0 | 1.3 | 1.3 | 5.3 | 1.3 | 2.1 | 5.7 |
| Tensile strength, σ, MPa | 10.0 | 9.2 | 8.2 | 13.2 | 10.2 | 8.7 | 15.0 | 13.6 | 12.0 |
| Relative elongation, ε1, % | 700 | 700 | 450 | 750 | 700 | 500 | 750 | 700 | 550 |
| Residual elongation, ε2, % | 10 | 10 | 10 | 10 | 10 | 10 | 10 | 10 | 10 |
| Hardness, Shore scale, relative units | 47 | 50 | 58 | 49 | 51 | 59 | 51 | 54 | 60 |

The table demonstrates in a clear manner the following trend:
- By increasing the amount of fillers and the content of silver dioxide therein, the modules at a percentage level of 100 and 300% elongation demonstrate improved behavior indexes.
- By increasing the amount of filler, the tensile strength decreases, but when increasing the amount of silver oxide it increases, the latter being also applicable to the relative elongation.
- The residual elongation does not change, remaining within the range of 10%, since all samples are vulcanized in the vulcanization optimal determined by the vulcanization isotherms. It can be concluded that the composites have a very good elasticity, since at a relative elongation within the range of 500-750% they retain a residual elongation of about 10%.
- Hardness in line with Shore scale increases when the amount of filler increases as well as in the event where the concentration of silver oxide in its composition increases.

The characterization of the fillers reveals that, in case the best case scenario, they contain one amorphous and two crystalline phases, and after addition of silver oxide in the composition, one amorphous and three crystalline phases. Changing the amount of silver oxide causes changes in the phase ratios within the filler itself, i.e cause structural changes therein. These changes in turn lead to changes in the strength of the rubber matrix-filler interaction and the thickness of the interfacial layer between the matrix and the filler. These changes produce changes in all the investigated properties of the composite materials. The existence of independent crystalline phases exerts a specific influence in a number of properties of the composite material, incl. causing an impact with regard to the physicomechanical ones.

The variation of the specific volume resistance of the composites according to the invention is shown in Table 6.

TABLE 6

Specific electrical volume resistance of natural rubber based vulcanizates having bioglass filler with different concentrations of silver oxide.

| Samples | $\rho_v$, Ω · m |
|---|---|
| NR-BG 0-10 | $2.84 \cdot 10^{14}$ |
| NR-BG 0-20 | $1.67 \cdot 10^{14}$ |
| NR-BG 0-45 | $5.65 \cdot 10^{13}$ |
| NR-BG 2-10 | $1.57 \cdot 10^{14}$ |
| NR-BG 2-20 | $1.07 \cdot 10^{14}$ |
| NR-BG 2-45 | $2.54 \cdot 10^{13}$ |
| NR-BG 4-10 | $1.13 \cdot 10^{14}$ |
| NR-BG 4-20 | $2.80 \cdot 10^{13}$ |
| NR-BG 4-45 | $1.30 \cdot 10^{13}$ |

The table demonstrates that with the increase in the amount of sol-gel derived bioactive glass, the specific volume resistivity decreases. With the increase of the amount of silver oxide therein, the specific volume resistivity also decreases, mainly due to the impact of elemental silver released in the system, as evidenced by the EDX investigations conducted with regard to the glass (FIG. 1-2, Table 3) and the gradual increase of its quantity.

Dynamic Characteristics

Table 7 and FIG. 3 reveal the results of studies of the dynamic properties of natural rubber-based composites containing sol-gel bioglasses.

TABLE 7

Important dynamic characteristics of the studied composites

|  | Tanδ @ 60° C. | Tanδ @ 0° C. | $T_g$, ° C. | Tanδ max |
|---|---|---|---|---|
| BG0-10 | 0.09 | 0.10 | −35.8 | 1.89 |
| BG0-20 | 0.12 | 0.14 | −34.4 | 1.71 |
| BG0-45 | 0.16 | 0.17 | −34.0 | 1.41 |
| BG2-10 | 0.11 | 0.11 | −36.7 | 1.94 |
| BG2-20 | 0.13 | 0.12 | −36.1 | 1.88 |
| BG2-45 | 0.15 | 0.18 | −34.7 | 1.55 |
| BG4-10 | 0.12 | 0.10 | −36.3 | 2.06 |
| BG4-20 | 0.15 | 0.12 | −35.7 | 1.88 |
| BG4-45 | 0.21 | 0.19 | −35.3 | 1.70 |

FIG. 3 shows the dependence of the storage modulus (a) and the tangent value with regard to the mechanical loss angle (b) on the temperature for composites containing bioglass (NR0 denotes a composite that does not contain a filler) The analysis of the results demonstrates and reveals the following:

- As the amount of filler increases, the values of tan δ @ 60° C. increase, as it does when the content of silver oxide increases. The values for this parameter of the composites with fillers are higher than the ones relating to composites without filler.
- the same trend is observed as well at a parameter of level tan δ @ 0° C. Compared to the unfilled composite, however, only the values of the composites containing 45 phr filler are higher, the others are lower.
- Tg/glass transition temperature, glass transition temperature in a highly elastic state/: when increasing amount of filler this temperature decreases, and by increasing the content of silver oxide it increases having an equal degree of filling.
- Tan δ max-when increasing the amount of filler, the values of this indicator decrease, and when the content of silver oxide increases at equal degree of filling these values tend to increase. The lower value of Tan δ max means that where there is available presence of the appropriate type and amount of relevant filler, the mobility of the macromolecules is restricted, probably due to the adsorption on the surface of the particles and due to the stronger interaction with them. Having regard to the aforementioned, it is logical that the lowest values are observed where highest degree of filling is applicable, where the probability of adsorption of macromolecules on the surface of particles is greatest. Obviously, as the amount of silver oxide increases, this probability decreases, which is why the value of Tan δ max increases in this case.

FIG. 3 illustrates the temperature dependence of the storage modulus (a) and the tangent value with regard to the dielectric loss angle (b) for some of the composites. Under circumstances of a temperature equal to −50° C. all composites show a plateau, the value of E' increases over the course of relevant filling, but the increase of the amount of silver oxide with an equal filler level produces a decrease therein. This behavior provides a practical exhibition that that bioglass particles increase the ability of the natural rubber matrix to maintain mechanical stresses with recoverable deformation [33]. The data derived from FIG. 6b reveals in a clear manner that the relaxation peak for the unfilled composite has a higher value than that of the biocomposites, due to its higher elasticity and its more intensively revealed dissipate energy trend during deformation compared to the biocomposites. The lower Tan δ max value of the biocomposites compared to the unfilled composite may be associated with the limited mobility of the macromolecules in the presence of bioglass fillers.

Dielectric Characteristics

The dielectric characteristics of composites BG0, BG2 and BG4 when filling 10, 20 and 45 parts by weight with regard to 100 parts by weight of rubber at frequency of fr=2565.33 MHz are summarized in Table 8. This frequency was chosen to evaluate the possible advantages for potential antenna applications of the composites subjected to investigation.

TABLE 8

Dielectric characteristics of composites based on natural rubber containing sol-gel derived bioglass.

| Designated concept | ε' | ε" | σ, S/m | tan $δ_ε$ |
|---|---|---|---|---|
| NR-0 | 2.250802 | 0.007568 | 0.001079 | 0.003362 |
| BG0-10 | 2.382024 | 0.00466 | 0.000665 | 0.001956 |
| BG0-20 | 2.419216 | 0.034865 | 0.002373 | 0.014412 |
| BG0-45 | 2.661398 | 0.016598 | 0.003968 | 0.006237 |
| BG2-10 | 2.472523 | 0.028047 | 0.001001 | 0.011343 |
| BG2-20 | 2.567453 | 0.011519 | 0.003643 | 0.004487 |
| BG2-45 | 2.762088 | 0.022375 | 0.004192 | 0.008100 |
| BG4-10 | 2.455436 | 0.032138 | 0.004084 | 0.013089 |
| BG4-20 | 2.600936 | 0.028737 | 0.004599 | 0.011048 |
| BG4-45 | 2.880128 | 0.031755 | 0.00473 | 0.011026 |

The results in the table demonstrate the strong influence of the chemical nature and structure of the fillers used with regard to the characteristics studied. After analyzing the data included in the table it can be concluded that as the amount of filler increases, as well as when the concentration of silver oxide in it increases, the values of the real and imaginary part of the dielectric constant increase. In any case, they are higher than the value of the unfilled composite, with the only exception being the δ" value for the composite containing 10 phr sol-gel derived glass with no silver oxide contained therein, which is lower. The observed changes causing an impact with regard to alteration of the real and imaginary part of the dielectric constant with the relevant filler also explain the changes in the tangent values of the dielectric loss angle tangent (tan $δ_ε$=ε"/ε'), where with the increase of the filler and the concentration of silver oxide therein a trend to increase its value is demonstrated, and in 2-3 particular cases when performing operation with filler of 20 and 45 phr there is evidence for deviations from this trend determined. It is noteworthy that the tan $δ_ε$ value for the BG0-10, BG0-45, BG2-20 composites according to the invention is too low and opens up opportunities for their antenna applications, in particular intended for use in terms of pads and/or insulating layers in flexible antennas for wireless communication. Despite the fact the most commonly used nowadays solid antennas currently provide opportunities for a number of relevant applications, the development of flexible antennas and the interest thereof has been increasing over the recent years.

According to the present invention, it has been surprisingly found that the concentration of silver oxide in bioglasses from the $CaO-SiO_2-P_2O_5-Ag_2O$ system has a significant impact with regard to significant set of natural rubber based biocomposite properties and the determination of the specific amount of filler provides an extremely good composite application properties for flexible antennas.

Natural rubber is used for the purposes of the present invention due to the following advantages: relatively low cost, easy processing, high elasticity and water resistance, is characterized by stable electrical properties and, more importantly, it is a product that is derived from renewable sources and is environmentally friendly. The properties of elastomer-based composites can be substantially altered by incorporating functional fillers into the rubber matrix. The value of the imaginary part of dielectric constant (also referred to as dielectric loss) in a multicomponent composite depends on a large number of complex phenomena, such as natural resonance, dipole relaxation, interphase polarity. Important factors for the formation of the real and imaginary part of the dielectric constant constitute also the degree of filling, the morphology and structure of the fillers used, the differences in the size and shape of their particles, as well as the differences in the morphology, structure and elemental composition of the composite.

Thermal Characteristics of Composites

The thermal characteristics of the tested composites are reported in Table 9.

TABLE 9

Thermal characteristics of biocomposites based on natural rubber containing bioglass fillers with different concentrations of silver oxide therein.

| | $T_{st}$, °C. | $T_{end}$, °C. | $\Delta T$, °C. | $\Delta m$ | $T_{max}$ |
|---|---|---|---|---|---|
| NR 0 | 213.3 | 459.1 | 245.8 | 18.27 | 360.6 |
| BG0-10 | 270.7 | 427.1 | 156.4 | 16.50 | 359.3 |
| BG0-20 | 240.1 | 423.3 | 183.2 | 15.40 | 357.7 |
| BG0-45 | 234.6 | 420.7 | 186.1 | 12.23 | 358.1 |
| BG2-10 | 278.0 | 461.3 | 183.3 | 16.76 | 360.1 |
| BG2-20 | 265.1 | 449.8 | 184.7 | 15.72 | 353.2 |
| BG2-45 | 241.4 | 429.6 | 188.2 | 12.62 | 358.9 |
| BG4-10 | 287.0 | 464.2 | 177.2 | 16.8 | 361.1 |
| BG4-20 | 273.2 | 458.7 | 185.5 | 15.58 | 358.6 |
| BG4-45 | 247.7 | 439.3 | 191.0 | 12.67 | 362.6 |

List of Designations and References in the Table:

$T_{st}$—onset of thermal decomposition reaction of the composite;

$T_{end}$—end of the thermal decomposition of the composite;

$\Delta T$—temperature difference between the beginning and the end of the destruction reaction;

$\Delta m$ mass loss for the whole destruction process, mg;

$T_{max}$—Thermal degradation temperature at which the degradation rate is maximum NR 0—composite with no filler.

The evidence revealed with regard to the table data demonstrates as follows:

- by increasing the amount of filler, the temperature of the onset of the thermal degradation reaction of the composite decreases, and by increasing the amount of silver oxide in the bioglass, it increases. This temperature remains significantly (30-70° C.) above the temperature of the unfilled composite, i.e the use of bioglass as a filler significantly increases the thermal resistance of destruction. The reason for this effect is the significantly higher thermal stability of the bioglass compared to that of the natural rubber matrix.
- by increasing the amount of the filler, the temperature of the end of the thermal degradation reaction decreases and by increasing the amount of silver oxide it increases.
- BG2-10 and BG4-10 composites have the highest thermal stability.
- with the increase in the degree of filling, all the filled composites are subjected to initiation of destruction at much higher temperatures than the unfilled ones, the temperature difference between the beginning and the end of the destruction reaction increases, and with the increase of the amount of silver oxide—the same process occurs. This difference remains less compared to the unfilled composite exactly due to the higher temperature of the onset of the degradation reaction.
- mass losses for the destruction process generally decrease as the amount of filler increases, while upon increase in the amount of silver oxide they remain virtually unchanged/evidence of imperceptible growth is reported/. Mass losses are reduced mainly due to the inorganic nature of the filler used and because of its thermal stability.
- the maximum degradation rate temperatures reveal a slightly decrease trend in the event of increased degree of filling and a slight increase upon increasing the amount of silver oxide, but generally remain close to the temperature of the maximum rate of destruction of the unfilled composite, which showed that the nature of the elastomer is limiting with regard to the destructive process, not the filler. The addition of the filler alters the mechanism of the destruction process from a single-step one/in the event of unfilled composite/with a maximum rate of destruction at 360.6° C. to four-stage process (temperature of the first stage—328.7° C., temperature of the second stage—355.2° C., temperature in the third stage, the most obviously expressed—362.6° C., the temperature in the fourth stage—380.9° C./evidenced with regard composites comprising intensive level of filler content/.

Thermal Conductivity Coefficient

The thermal conductivity coefficient of the tested composites according to the invention is manifested within Table. 10.

TABLE 10

Thermal conductivity coefficients of biocomposites based on natural rubber containing bioglass filler with different concentrations of silver oxide therein.

| Samples | $\lambda$, W/m · K |
|---|---|
| NR-0 | 0.130 |
| BG 0-10 | 0.154 |
| BG 0-20 | 0.169 |
| BG 0-45 | 0.185 |
| BG 2-10 | 0.175 |
| BG 2-20 | 0.190 |
| BG 2-45 | 0.210 |
| BG 4-10 | 0.207 |
| BG 4-20 | 0.225 |
| BG 4-45 | 0.295 |

The advantages provided by the composition included in relevant application are:

The presence of $CaO—SiO_2—P_2O_5—Ag_2O$ system filler causes a significant effect and impact on the properties of natural rubber based biocomposites.

The positive effect of both the degree of filling using bioglass and the concentration of silver oxide therein on all the studied properties of the composites—vulcanization, physicomechanical, dynamic, dielectric, thermal properties, volume electrical resistivity, thermal conductivity coefficient has been proven. The antibacterial properties of the composites of the invention have been demonstrated.

Improved thermal stability and some of the physicomechanical performance of the composites constitute an unexpected output. The volume resistivity decreases and the thermal conductivity coefficients increase.

The dielectric characteristics of the biocomposites according to the invention provide evidence of their practical use as pads and insulating layers with regard to flexible antennas for short-range wireless communications.

DESCRIPTION OF THE ENCLOSED DRAWINGS

FIG. 1a demonstrates a SEM image of an observed wide area of sol-gel derived bioglass containing 4% silver oxide.

Figure 1B:
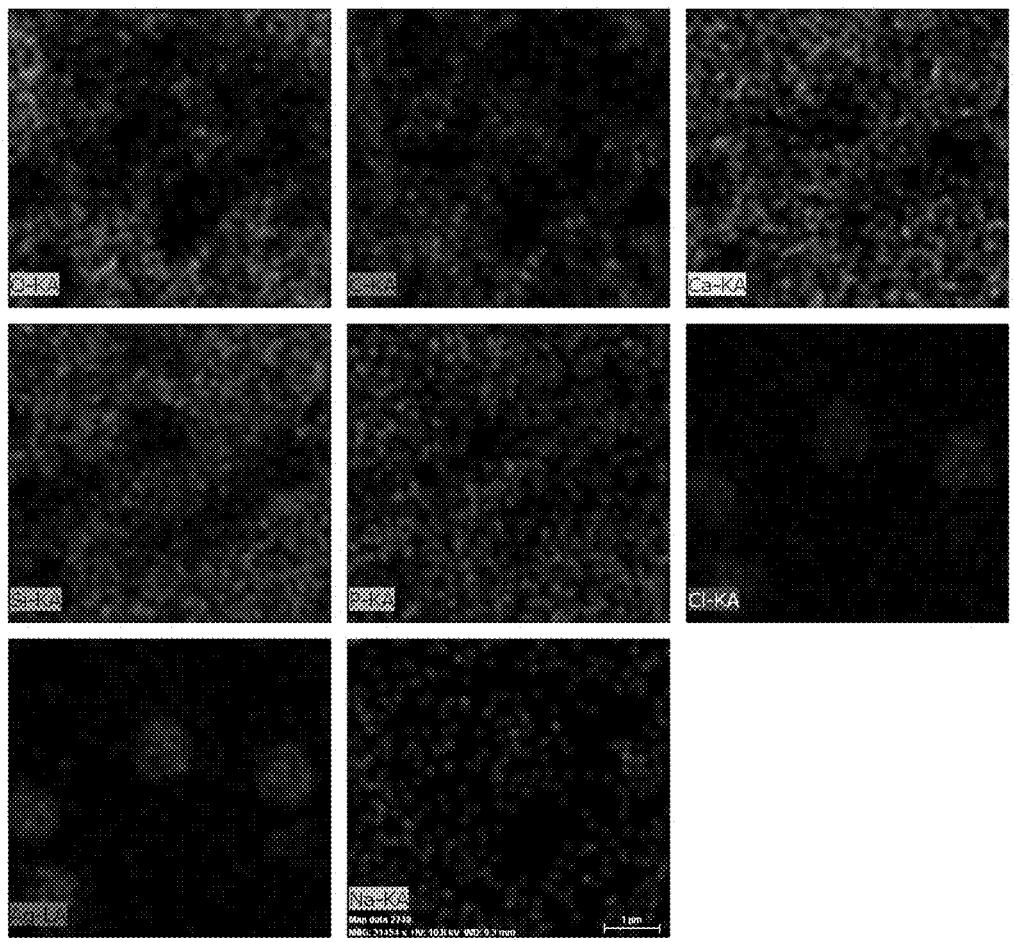

FIG. 1b demonstrates SEM images of relevant qualitative and quantitative distribution therein.

Figure 2A:
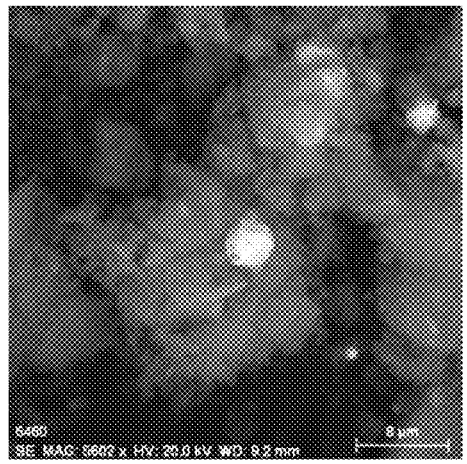

FIG. 2a demonstrates a SEM image of sol-gel derived bioglass containing 4% silver oxide, at separate points of which (the latter being indicated within the images of FIG. 2 by means of a cross mark) EDX analysis was performed.

Figure 2B:
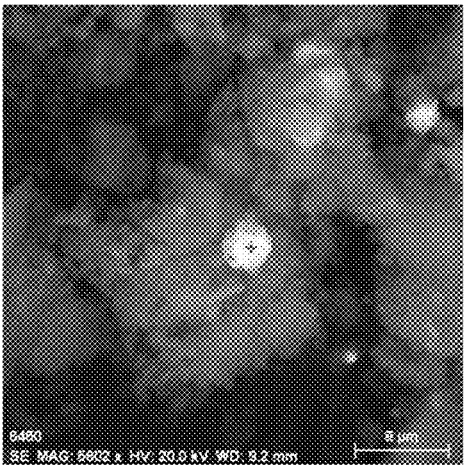

FIG. 2b demonstrates a SEM image of sol-gel derived bioglass containing 4% silver oxide, at separate points of which (the latter being indicated within the images of FIG. 2 by means of a cross mark) EDX analysis was performed.

Figure 2C:
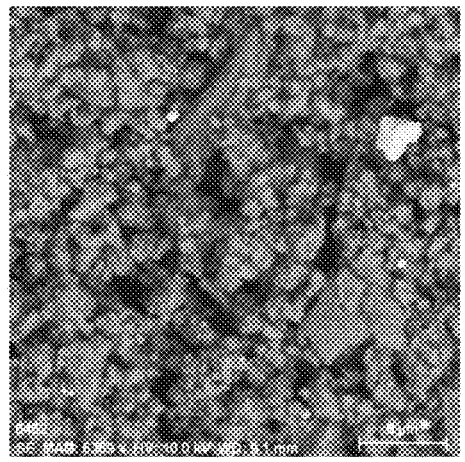

FIG. 2c demonstrates a SEM image of sol-gel derived bioglass containing 4% silver oxide, at separate points of which (the latter being indicated within the images of FIG. 2 by means of a cross mark) EDX analysis was performed.

Figure 2D:
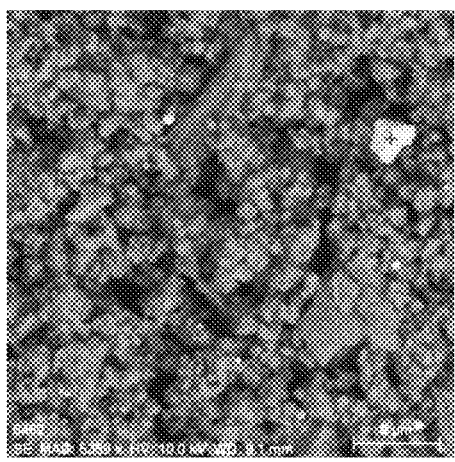

FIG. 2d demonstrates a SEM image of sol-gel derived bioglass containing 4% silver oxide, at separate points of which (the latter being indicated within the images of FIG. 2 by means of a cross mark) EDX analysis was performed.

Figure 3A:
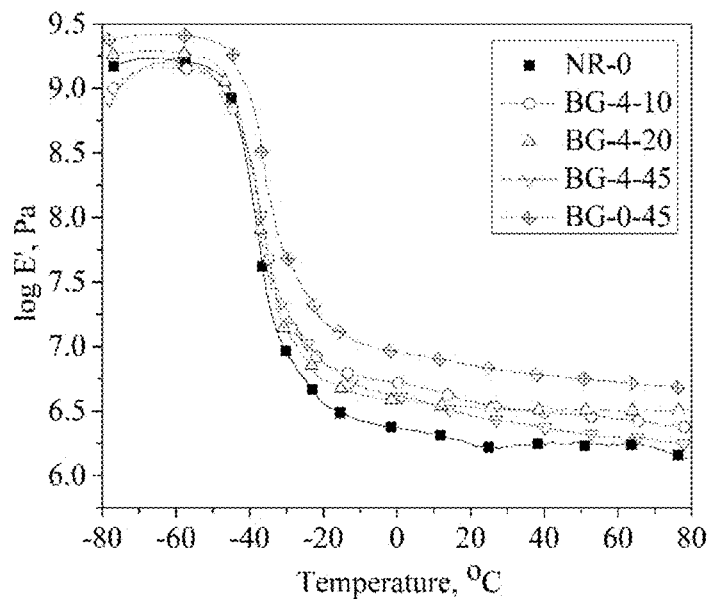

FIG. 3a reveals the dependence of the storage modulus on the temperature for composites containing bioglass (NR0 denotes a composite that does not contain a filler).

Figure 3B:
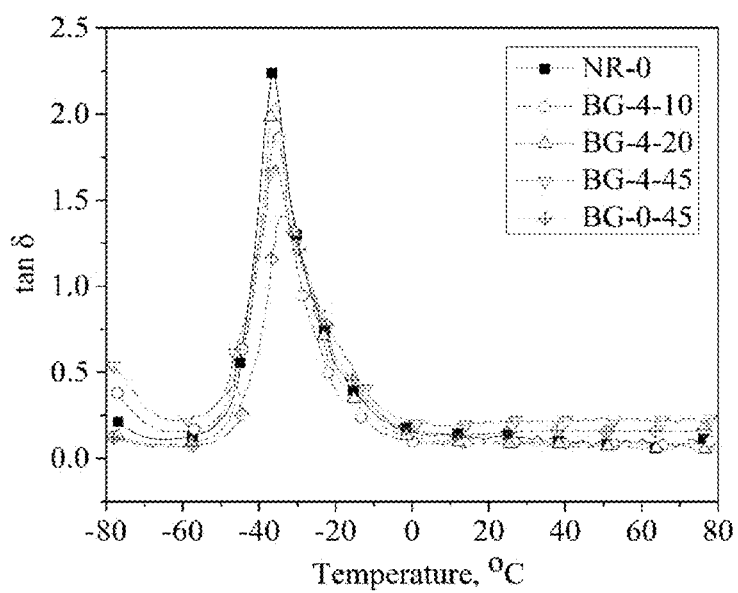

FIG. 3b reveals the tangent on the mechanical loss angle on the temperature for composites containing bioglass (NR0 denotes a composite that does not contain a filler).

EXAMPLES OF EMBODIMENT OF THE INVENTION

The invention is described in more detail by means of preferred embodiment's representation without limiting its scope.

Example Number 1

The construction of the composite according to the invention comprises, expresses in parts by weight:
Natural rubber STR 10-100
Zinc oxide—2.5
Stearic acid—1.0
Sol-gel derived filler—8.00
/Silane Si 69/Bis (triethoxysilylpropyl)tetrasulfide—4.00
IPPD/isopropyl phenyl-p-phenylenediamine/anti-aging agent/—0.5
TBBS/tertiary butyl-benzothiazolyl sulphenamid)—a vulcanization accelerator/—1.0
Sulfur—1.00

The composition of the sol-gel derived glass was CaO—49.00, $SiO_2$—39.00, $P_2O_5$—8.00, $Ag_2O$—0.1

The sol-gel derived glass is prepared in advance by means of a specially designed procedure involving heating to 600° C. after which a mixing procedure is conducted involving addition of elastomer during the manufacture of the rubber mixture together with the other ingredients referred to above.

The mixture is made in an open laboratory rolls mixing mill with roller dimensions of L/D 320×160 mm, friction 1.27 and slower roller speed 25 $min^{-1}$. The vulcanization of the rubber mixture was carried out on an electrically hydraulic vulcanization press with plates of 400×400 mm at a temperature of 150° C., a pressure of 10 MPa and a time determined by the vulcanization isotherms of the mixtures taken on a MDR 2000 Rheometer manufactured by AlphaTechnology.

Example Number 2

The composition of the biocomposite includes:
Natural rubber STR 10-100
Zinc oxide—3.5
Stearic acid—2.5
Filler—50
/Silane Si 69/Bis (triethoxysilylpropyl)tetrasulfide—6
IPPD/isopropyl phenyl-p-phenylenediamine/anti-aging agent/—1.5
TBBS/tertiary butyl-benzothiazolyl sulphenamid)—a vulcanization accelerator/—2.5
Sulfur—3.00

The composition of the sol-gel derived glass was CaO—51, $SiO_2$—41%, $P_2O_5$—8%, $Ag_2O$—4.0 and is obtained in a manner identical to the one revealed in Example number one.

The composition of the elastomer biocomposite is obtained by means of implementation of a technology identical to the one revealed in example 1.

Example Number 3

The composition of the biocomposite includes:
Natural rubber STR 10-100
Zinc oxide—3
Stearic acid—2
Filler—20
/Silane Si 69/Bis (triethoxysilylpropyl)tetrasulfide—5
IPPD/isopropyl phenyl-p-phenylenediamine/anti-aging agent/—1
TBBS/tertiary butyl-benzothiazolyl sulphenamid)—a vulcanization accelerator/—1.5
Sulfur—2.00

The composition of the sol-gel derived glass is identical to the one as revealed in Example Number 2.

The composition of the elastomer biocomposite is obtained by means of implementation of a technology identical to the one revealed in example 1.

The invention claimed is:
1. A composition of an elastomeric biocomposite designed for insulating layers and pads with regard to flexible antennas, comprising natural rubber, and further comprising, per 100 weight parts of the natural rubber:
    8 to 50 parts sol-gel derived glass;
    2.5 to 3.5 parts zinc oxide;
    1 to 2.5 parts stearic acid;
    4 to 6 parts bis-(triethoxysilylpropyl)-tetrasulfide;
    1 to 2.5 parts tertiary butyl-benzothiazolyl sulfenamide;
    1 to 3 parts sulfur; and
    0.5 to 1.5 parts isopropyl-phenyl-β-phenylene-diamine;
    wherein the sol-gel glass contains 49-51% CaO, 39-41% $SiO_2$, 8% $P_2O_5$, and 0.1-4% $Ag_2O$.

* * * * *